United States Patent
Sordelet (10) Patent No.: US 12,431,260 B2
(45) Date of Patent: Sep. 30, 2025

(54) HIGH-VELOCITY AIR-FUEL COATINGS FOR CONDUCTOR CORROSION RESISTANCE

(71) Applicant: Caterpillar Inc., Peoria, IL (US)

(72) Inventor: Daniel Joseph Sordelet, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 566 days.

(21) Appl. No.: 17/934,972

(22) Filed: Sep. 23, 2022

(65) Prior Publication Data

US 2024/0105356 A1 Mar. 28, 2024

(51) Int. Cl.
*H01B 5/06* (2006.01)
*B60M 7/00* (2006.01)

(52) U.S. Cl.
CPC ............ *H01B 5/06* (2013.01); *B60M 7/00* (2013.01)

(58) Field of Classification Search
CPC .... H01B 5/06; B60M 7/00; B60L 5/00; B60L 5/12; B60L 9/00; B60L 15/00; B60L 15/20
See application file for complete search history.

(56) References Cited

U.S. PATENT DOCUMENTS

| | | | | |
|---|---|---|---|---|
| 2,716,223 A | * | 8/1955 | Griefen | H01R 39/30 439/5 |
| 2,748,701 A | | 6/1956 | Barrows | |
| 2,889,531 A | | 6/1959 | Ellerman et al. | |
| 3,097,031 A | | 7/1963 | Cooley | |
| 8,636,124 B2 | * | 1/2014 | Beardsley | C23C 28/023 191/22 DM |
| 9,531,219 B2 | * | 12/2016 | Nam | B60L 5/00 |
| 2019/0148741 A1 | * | 5/2019 | Kucernak | H01M 8/0213 429/518 |
| 2022/0149549 A1 | * | 5/2022 | Harako | G01R 1/07342 |

FOREIGN PATENT DOCUMENTS

| | | |
|---|---|---|
| CN | 204103062 U | 1/2015 |
| CN | 106967350 A | 7/2017 |
| CN | 107706574 A | 2/2018 |
| CN | 108273713 A | 7/2018 |
| CN | 111577548 A | 8/2020 |
| CN | 111987485 A | 11/2020 |
| GB | 1229584 A | 4/1971 |

OTHER PUBLICATIONS

Written Opinion and International Search Report for Int'l. Patent Appln. No. PCT/US2023/072542, mailed Nov. 27, 2023 (12 pgs).
Geddis et al., "The effect of static liquid galinstan on common metals and non-metals at temperatures up to 200° C.," Dec. 2020. Canadian Journal of Chemistry, 98(12): 787-798.

* cited by examiner

*Primary Examiner* — Robert J McCarry, Jr.
(74) *Attorney, Agent, or Firm* — Lee & Hayes (57) ABSTRACT

A work machine, such as a hauler at a mining site, includes a conductor rod housing concentric metal tubes for receiving electrical power from a contactor sliding on a power rail. Electrical connectivity between conductors within the conductor rod are provided using a conductive liquid. Corrosion barriers are used to protect the conductors while maintaining the electrical connectivity between the conductors.

20 Claims, 6 Drawing Sheets

```
┌─────────────────────────────────────────────────────────┐
│ APPLY A CORROSION BARRIER TO AN INTERIOR SURFACE OF A   │
│                   CYLINDER CONDUCTOR                    │
│                           602                           │
└─────────────────────────────────────────────────────────┘
                              ↓
┌─────────────────────────────────────────────────────────┐
│ APPLY A CORROSION BARRIER TO AN INTERIOR SURFACE OF A   │
│                   BARREL CONDUCTOR                      │
│                           604                           │
└─────────────────────────────────────────────────────────┘
                              ↓
┌─────────────────────────────────────────────────────────┐
│  INSERT THE CYLINDER CONDUCTOR INTO THE BARREL          │
│       CONDUCTOR TO FORM A CONDUCTOR ROD                 │
│                           606                           │
└─────────────────────────────────────────────────────────┘
                              ↓
┌─────────────────────────────────────────────────────────┐
│   FILL A LIQUID SPACE OF THE CYLINDER CONDUCTOR WITH A  │
│                    CONDUCTIVE LIQUID                    │
│                           608                           │
└─────────────────────────────────────────────────────────┘
                              ↓
┌─────────────────────────────────────────────────────────┐
│   ATTACH THE BARREL CONDUCTOR AND THE CYLINDER          │
│       CONDUCTOR TO ELECTRICAL CONTACTS                  │
│                           610                           │
└─────────────────────────────────────────────────────────┘
                              ↓
┌─────────────────────────────────────────────────────────┐
│ ELECTRICALLY AND PHYSICALLY CONNECT THE CONDUCTOR       │
│ ROD TO A WORK VEHICLE AND ELECTRICAL POWER SOURCE TO    │
│              POWER THE WORK VEHICLE                     │
│                           612                           │
└─────────────────────────────────────────────────────────┘
```

*FIG. 6*

HIGH-VELOCITY AIR-FUEL COATINGS FOR CONDUCTOR CORROSION RESISTANCE

TECHNICAL FIELD

The present disclosure relates generally to systems for providing electrical power using a conductive liquid as an electrical interface.

BACKGROUND

Heavy work machines, such as earth-moving vehicles or hauling trucks, require significant power to carry out their functions. The machines themselves can be of substantial weight, and their loads require large amounts of power to move. Diesel engines typically provide that power, but they can have disadvantages. For instance, in some implementations, heavy work machines may need to travel large distances through rugged terrain. At a remote mining site, for example, groups of these machines are often employed to ferry extreme loads along roadways, or haul routes, extending between various locations within the mining site. Supplies of diesel fuel may be far away from such locations or not easily delivered to such locations. In addition, the groups of diesel machines can generate significant pollution.

Electrical power has been used to supplement these diesel engines while the work machines move. In some environments, the electrical power is delivered from wires over the haul route to a pantograph on the work machine as the machine travels the haul route, as in a cable car. But overhead wires cannot reliably provide sufficient electrical energy to power a heavy work machine during long movements. Nor can the overhead delivery provide enough current to charge backup batteries for an electric machine at the same time. As a result, electrical power through overhead wires typically supplements, rather than replaces, diesel engines in heavy work machines.

Alternatively, a power rail based on the ground may provide electrical power to heavy work machines. An axially moveable cylindrical rod includes at one end an interface with the work machine and at an opposite end a connection with the power rail at the side of a haul route, for example. In some situations, the interface with the work machine not only provides electrical power from the rod to the work machine, but also passes pressurized air from the work machine into the rod for energizing pneumatic controls. In addition, signaling data may need to be passed between the rod and the work machine for electrical sensors or controls. Accommodating these interfaces in a cylindrical rod handling high-voltage electrical power can be challenging.

For example, because of the varying distance between the power rail and the work machine, these electrical interfaces extend and retract to maintain an electrical and physical contact between the work machine and the power rail. In examples in which the surface of one electrical contact slides against a surface of another electrical contact to accommodate the movement of the work machine in relation to the power rail, the electrical contact can be maintained using various technologies. For example, carbon brushes/pads can be used, whereby the carbon brushes/pads are designed to be at least partially conductive to maintain the electrical contact while allowing the different surfaces to move in relation to each other.

Another example is to use a liquid metal media as the conductive media. The liquid metal media is formed from various metals and alloys that are liquid at or near the operational temperature that would be experienced by the liquid metal media at the electrical interface. Some of these metals and alloys include gallium alloy, gallium-indium alloy, gallium-indium-tin alloy, gallium-indium-tin-zinc alloy, bismuth alloy, lead-bismuth alloy, bismuth-indium-tin alloy, bismuth-indium-tin-zinc alloy, and the like. However, these liquid alloys often rapidly and significantly corrode most types of typical electrical conductors like copper, aluminum, iron, and their alloys. Thus, in order to prevent corrosion, often a barrier between the liquid metal and the electrical conductors is deposited. While being electrically conductive themselves, the barrier protects the electrical conductors from the corrosive effects of the liquid metal media.

One approach for providing the barrier is described in Chinese Patent App. Pub. No. CN108273713 ("the '713 application"). The '713 application describes a process of depositing a high temperature resistive coating to an electrical conductor. The process entails sandblasting, shot blasting, or grinding the surface of the electrical conductor to a certain smoothness and then painting a high temperature resistive paint onto the surface. The paint can be formed from silicon, phosphate power, or zinc powder. According to the '713 application, once the paint is cured, an electrically conductive coating is formed that acts as a corrosion barrier between the electrical conductor and the liquid metal. However, such a process requires multiple steps, such as the sandblasting/grinding, painting of the barrier, and a cure period. Further, when sandblasting is used, often the size or area of the component able to be treated is limited to the internal volume of the sandblasting chamber. Finally, the density of the painted and cured layer can be limited to the ratio of solvent/solute available for use, thus potentially limiting the applications to which the layer may be applied.

Examples of the present disclosure are directed to overcoming these and other deficiencies of such systems.

SUMMARY

In one aspect of the presently disclosed subject matter, a work machine is disclosed. The work machine includes an electric engine, traction devices configured to cause movement of the work machine when powered by the electric engine, and a conductor rod configured to convey electrical energy to the work machine during a movement of the work machine, the conductor rod having a first end and a second end. The conductor rod includes a barrel comprising a barrel conductor having an inner diameter and a longitudinal center defining an axis between the first end and the second end and an arm comprising a cylinder conductor arranged concentrically and slidable engaged into the barrel conductor around the axis, a liquid space configured to contain a conductive liquid, the liquid space defined by an interior surface of the cylinder conductor and an outer surface of the barrel conductor, a first corrosion barrier along the interior surface of the cylinder conductor and a second corrosion barrier along the outer surface of the barrel conductor, the first corrosion barrier and the second corrosion barrier comprising a metal alloy having a chemical resistance and a low permeability to the conductive liquid contained within the liquid space, and a liquid junction formed from the liquid space, the first corrosion barrier, the second corrosion barrier, and the conductive liquid, the liquid junction configured to electrically connect the barrel conductor to the cylinder conductor.

In a further aspect of the presently disclosed subject matter, a conductor rod is disclosed. The conductor rod includes a barrel comprising a barrel conductor having an inner diameter and a longitudinal center defining an axis between a first end and a second end, an arm comprising a cylinder conductor arranged concentrically and slidable engaged into the barrel conductor around the axis, a liquid space configured to contain a conductive liquid, the liquid space defined by an interior surface of the cylinder conductor and an outer surface of the barrel conductor, a first corrosion barrier along the interior surface of the cylinder conductor and a second corrosion barrier along the outer surface of the barrel conductor, the first corrosion barrier and the second corrosion barrier comprising a metal alloy having a chemical resistance and a low permeability to the conductive liquid contained within the liquid space, and a liquid junction formed from the liquid space, the first corrosion barrier, the second corrosion barrier, and the conductive liquid, the liquid junction configured to electrically connect the barrel conductor to the cylinder conductor.

In a still further aspect of the presently disclosed subject matter, a method of manufacturing a conductor rod is disclosed. The method includes applying a first corrosion barrier to at least a portion of an interior surface of a cylinder conductor using a using a high velocity air fuel process, the first corrosion barrier comprising a first matrix of a nickel chromium alloy (Ni-20Cr) and aluminum oxide ($Al_2O_3$) particles, applying a second corrosion barrier to at least a portion of an exterior surface of a barrel conductor using the high velocity air fuel process, the first corrosion barrier comprising a second matrix of a nickel chromium alloy (Ni-20Cr) and aluminum oxide ($Al_2O_3$) particles, and wherein the interior surface of the cylinder conductor and the exterior surface of the barrel conductor define a liquid space for containing a conductive liquid, inserting the cylinder conductor into the barrel conductor to form a conductor rod, and filling at least a portion of the liquid space with the conductive liquid.

DETAILED DESCRIPTION

Figure 1:
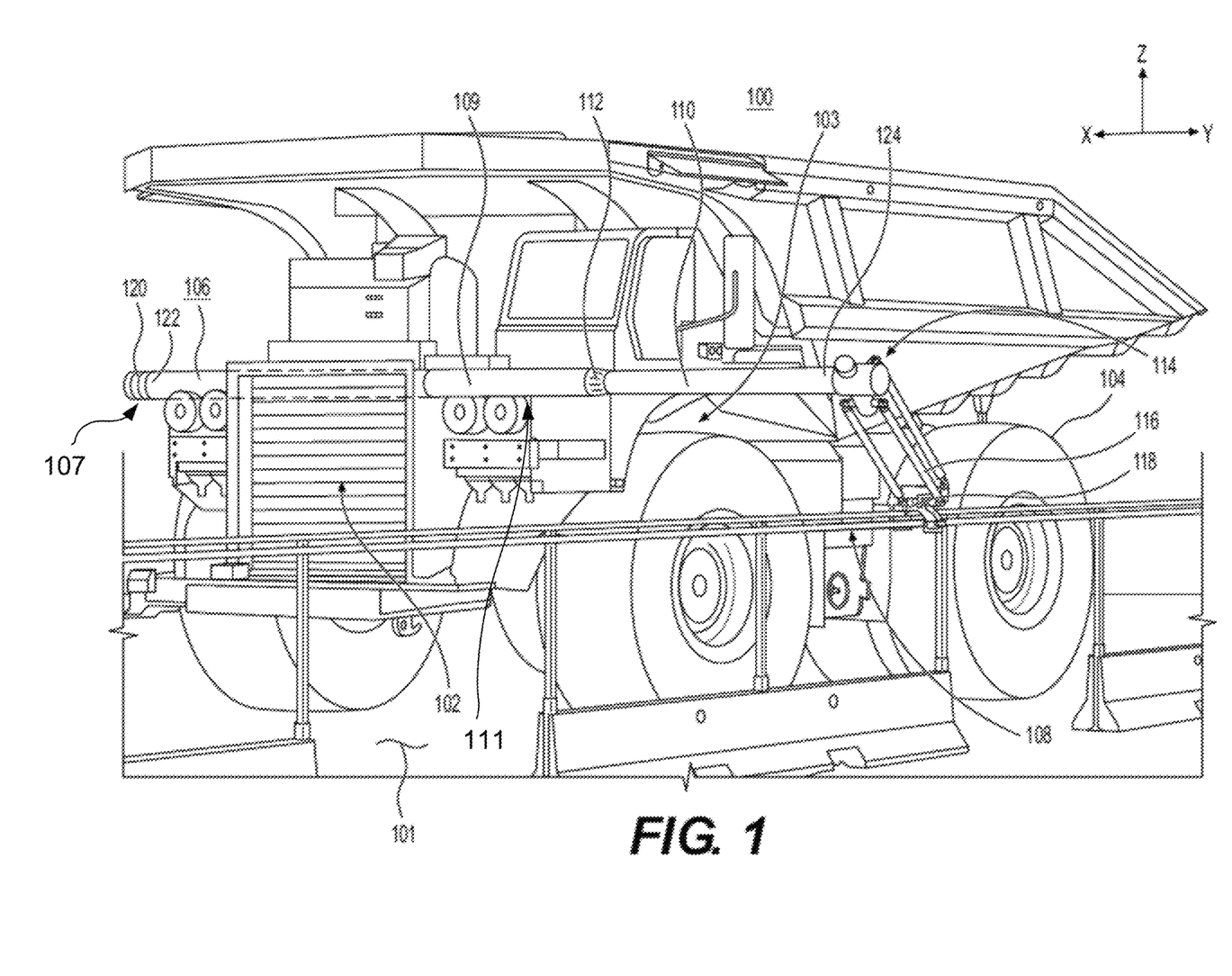
FIG. 1 illustrates an isometric view of a work machine within an XYZ coordinate system as one example suitable for carrying out the principles discussed in the present disclosure.

Wherever possible, the same reference numbers will be used throughout the drawings to refer to same or like parts. FIG. 1 illustrates an isometric view of a work machine 100 within an XYZ coordinate system as one example suitable for carrying out the principles discussed in the present disclosure. The exemplary work machine 100 travels parallel to the X axis along a roadway, also termed a haul route 101, typically from a source to a destination within a worksite. In one implementation as illustrated, work machine 100 is a hauling machine that hauls a load within or from a worksite within a mining operation. For instance, the work machine 100 may haul excavated ore or other earthen materials from an excavation area along haul route 101 to dump sites and then return to the excavation area. In this arrangement, work machine 100 may be one of many similar machines configured to ferry earthen material in a trolley arrangement. While a large mining truck in this instance, work machine 100 may be any machine that carries a load between different locations within a worksite, examples of which include an articulated truck, an off-highway truck, an on-highway dump truck, a wheel tractor scraper, or any other similar machine. Alternatively, work machine 100 may be an off-highway truck, on-highway truck, a dump truck, an articulated truck, a loader, an excavator, a pipe layer, or a motor grader. In other implementations, work machine 100 need not haul a load and may be any machine associated with various industrial applications including, but not limited to, mining, agriculture, forestry, construction, and other industrial applications.

Referring to FIG. 1, an example work machine 100 includes a frame 103 powered by electric engine 102 to cause rotation of traction devices 104. Traction devices 104 are typically four or more wheels with tires, although tracks or other mechanisms for engagement with the ground along haul route 101 are possible. Electric engine 102 functions to provide mechanical energy to work machine 100 based on an external electrical power source, such as described in further detail below. An example of mechanical energy provided by electric engine 102 includes propelling traction devices 104 to cause movement of work machine 100 along haul route 101, but electric engine 102 also includes components sufficient to power other affiliated operations within work machine 100. For instance, in some implementations, electric engine 102 includes equipment for converting electrical energy to provide pneumatic or hydraulic actions within work machine 100. While electric engine 102 is configured to operate from an external electrical power source, electric engine 102 typically includes one or more batteries for storing electrical energy for auxiliary or backup operations.

In accordance with the principles of the present disclosure, and relevant to the presently disclosed subject matter, the work machine 100 further includes a conductor rod 106 configured to receive electrical power from a power rail 108. In some examples, power rail 108 is one or more beams of metal arranged substantially parallel to and a distance above the ground. In FIG. 1, power rail 108 is positioned to be substantially parallel to the X axis and the direction of travel of work machine 100. Support mechanisms hold power rail 108 in place along a distance at the side of haul route 101 for work machine 100 to traverse. The support mechanisms and power rail 108 may be modular in construction, enabling their disassembly and reassembly at different locations or their repositioning along the existing haul route 101. Moreover, while shown in FIG. 1 to the left of work machine 100 from the perspective of an operator sitting in the cab of the work machine 100, power rail 108 may be disposed to the right of work machine 100 or in other locations suitable to the particular implementation.

Power rail 108 provides a source of electrical power for work machine 100 as either AC or DC. In some examples, power rail 108 has two or more conductors, each providing voltage and current at a different electrical pole. In one implementation (e.g., an implementation in which the power rail 108 includes three conductors), one conductor provides positive DC voltage, a second conductor provides negative DC voltage, and a third conductor provides 0 volts relative to the other two conductors. The two powered conductors within power rail 108 provide +1500 VDC and −1500 VDC. These values are exemplary, and other physical and electrical configurations for power rail 108 are available and within the knowledge of those of ordinary skill in the art. Further, it should be understood that the voltages described herein are merely exemplary, as various levels of AC voltage may be used, as well as a combination of AC and DC voltages, depending on the particular configuration.

Conductor rod 106 enables electrical connection between work machine 100 and power rail 108, including during movement of work machine 100 along haul route 101. In the example shown in FIG. 1, conductor rod 106 is an elongated arm resembling a pole. FIG. 1 shows conductor rod 106 positioned along a front side of work machine 100, with respect to the direction of travel of work machine 100 in the direction of the X axis. In this arrangement, conductor rod 106 is located in FIG. 1 in the Y-Z plane essentially along the Y axis with a first end 107 near a right side of work machine 100 and a second end 111 at a left side of work machine 100. Conductor rod 106 may be attached to any convenient location within work machine 100, such as to frame 103, in a manner to couple conductor rod 106 to power rail 108. Shown in FIG. 1 as extending to a left side of work machine 100 toward power rail 108, conductor rod 106 may alternatively be arranged to extend to a right side and at any desired angle from work machine 100 such that conductor rod 106 may be coupled to power rail 108 for obtaining electrical power.

As embodied in FIG. 1, conductor rod 106 includes a barrel 109 mounted to frame 103 of work machine 100. Barrel 109 has a hollow interior and may be a conductive metal having suitable mechanical strength and resiliency, such as aluminum. Within barrel 109, an arm 110 is retained. Arm 110 is engaged within conductor rod 106 along the Y axis in FIG. 1. A length of conductor rod 106 roughly spans the width of work machine 100. A junction 112 serves as the junction or interface between arm 110 and barrel 109, which is the main body of conductor rod 106. When arm 110 is fully retracted or collapsed into barrel 109, junction 112 essentially becomes the left edge of conductor rod 106. On the other hand, when arm 110 is extended from barrel 109 of conductor rod 106, arm 110 may reach from work machine 100 to proximate power rail 108 on the side of haul route 101.

Within, and possibly including barrel 109, conductor rod 106 includes a series of electrical conductors passing longitudinally, at least from a head 122 at a proximal end of the conductor rod 106 to a tip 124 at a distal end of the conductor rod 106. Typically, the conductors within conductor rod 106 are formed of a metallic material and are rigid. In some examples, the conductors are concentric tubes, or hollow cylinders, of solid metal such as copper, aluminum, gold, silver, nickel, zinc, or alloys thereof nested together and sized to provide electrical capacity sufficient for powering work machine 100. Other conductive materials may be used, such as graphite, and are considered to be within the scope of the presently disclosed subject matter. Tubular conductors within arm 110 engage with corresponding tubular conductors within barrel 109 to provide for electrical continuity. In other examples, one or more concentric copper tubes, rather than aluminum, of varying diameters may be used as tubular conductors. Other types of conductive tubes may be used and are within the scope of the presently disclosed subject matter. In some examples, electrical conductivity between the tubular conductors within the arm 110 engage and corresponding tubular conductors within the barrel 109 are provided using various liquid metals, such as gallium alloys, gallium-indium alloy, gallium-indium-tin alloy, gallium-indium-tin-zinc alloy, bismuth alloy, lead-bismuth alloy, bismuth-indium-tin alloy, bismuth-indium-tin-zinc alloy, and the like, as will be described in more detail in the figures, below.

Returning to FIG. 1, at tip 124, a connector assembly 114 provides an interface to power rail 108 via trailing arms 116 and contactor 118. Power rail 108 is typically arranged along a side of haul route 101, and work machine 100 is steered so that it traverses haul route 101 substantially in parallel with power rail 108. Thus, in reference to FIG. 1, power rail 108 and a travel path for work machine 100 are substantially in parallel with each other and with the X axis. Contactor 118 is configured to maintain an electrical connection with power rail 108 while sliding along its surface in the direction of the X axis as work machine 100 moves. In some examples, trailing arms 116 are conductors coupled to contactor 118, each conducting voltage and current at a different electrical pole and corresponding to the conductors within conductor rod 106. In operation, electrical power is accessed from power rail 108 via contactor 118, which remain in contact during movement of work machine 100, and the electrical power is conducted through trailing arms 116 into connector assembly 114.

From connector assembly 114, the electrical power is conveyed at tip 124 through the nested tubular conductors within arm 110 and barrel 109 to head 122 of conductor rod 106 and through a head-end interface 120 to work machine 100. Head-end interface 120 provides at least an electrical connection between conductor rod 106 and work machine 100 for powering electric engine 102 and otherwise enabling operations within work machine 100. In some examples, head-end interface 120 may also provide an interface for inputs to control mechanical operation of conductor rod 106.

As noted above, the tubular or cylindrical nature of conductor rod 106 lend a degree of rigidity greater than a solid conductor of similar or smaller mass or weight to conductor rod 106 due to a larger moment of inertia of a hollow tube than a solid rod of similar mass. Thus, by forming the conductive material into a hollow tube rather than a solid rod, for similar conductive performance, conductor rod 106 can provide a mechanism to conduct electrical power from a source to a load over an unsupported distance. As described above, trailing arms 116 are conductors coupled to contactor 118, each conducting voltage and current at a different electrical pole and corresponding to the conductors within conductor rod 106. Liquid metals provide the electrical interface to allow for the movement of the tubular conductors within the arm 110 in relation to the corresponding tubular conductors within the barrel, illustrated in more detail in FIG. 2, below.

Figure 2:
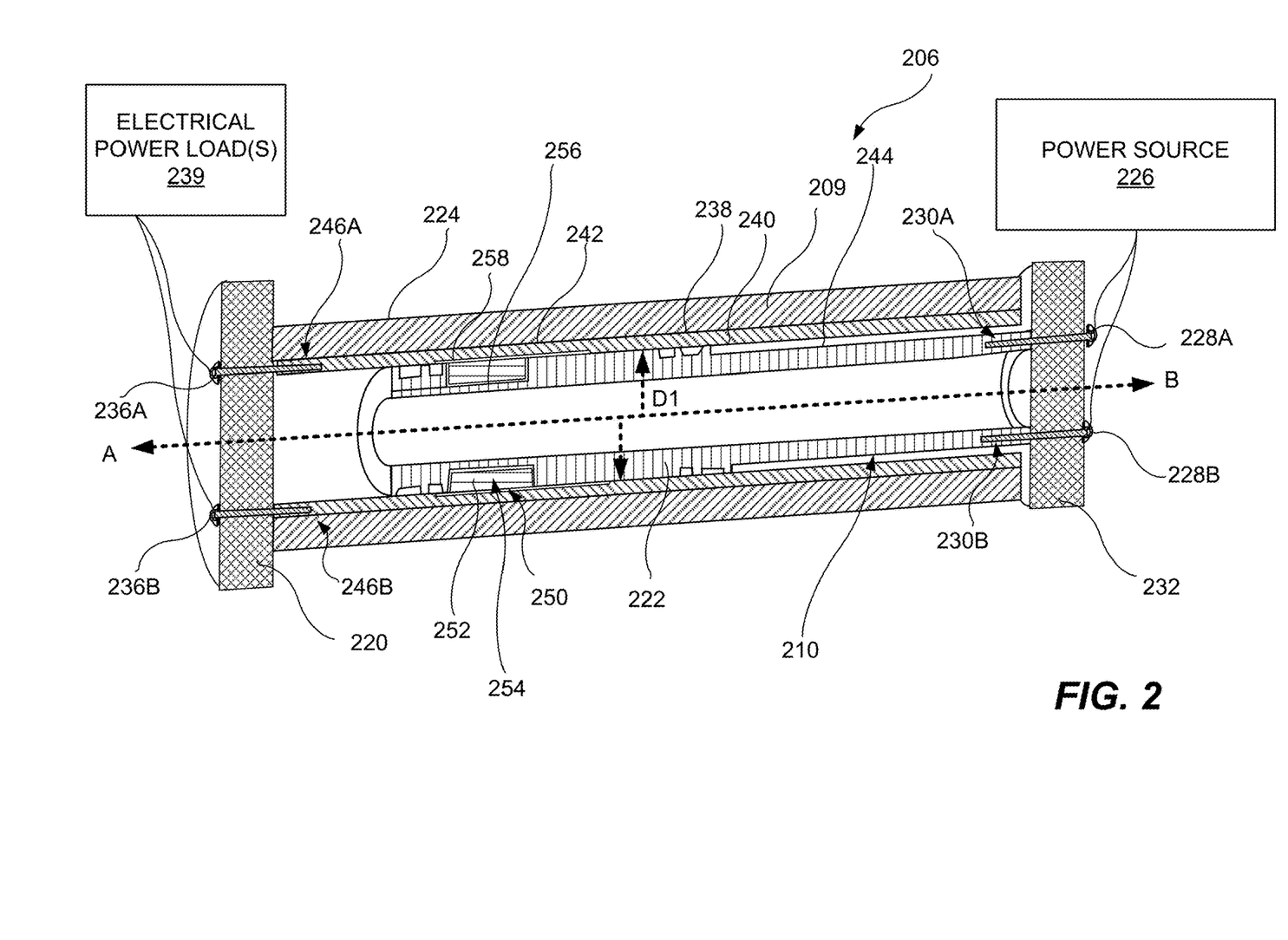
FIG. 2 illustrates a longitudinal section of a conductor rod with an arm disposed in a barrel, in accordance with one or more examples of the present disclosure.

FIG. 2 illustrates a longitudinal cross-section of a conductor rod 206 with an arm 210 disposed in a barrel 209, in accordance with one or more examples of the present disclosure. The arm 210 includes a cylinder conductor 222 of tubular shape, i.e., a hollow cylinder. In this example, from an axial center AB extending along the center of the cylinder conductor 222 towards a barrel outer surface 224, the cylinder conductor 222 is positioned concentrically along the axial center AB of the barrel 209 (i.e., the longitudinal axis of the 209) and is a tubular conductor made of aluminum or a similar metal with a desired electrical conductivity and a desired mechanical strength. When connected to electrical power from a power source 226, such as the power rail 108 of FIG. 1, the electrical power from the power source 226 flows into arm electrical contacts 228A and 228B. The arm electrical contacts 228A and 228B are mechanically connected to the cylinder conductor 222 at electrical contact points 230A and 230B, respectively. Along with providing an electrical pathway from the electrical contacts 228A and 228B to the cylinder conductor 222, the electrical contact points 230A and 230B also affix the cylinder conductor 222 to an arm endcap 232. Thus, as will be described in more detail below, when the cylinder conductor 222 changes location within the barrel 209, the cylinder conductor 222 and the arm endcap 232 move as a single unit.

Electrical power received from the cylinder conductor 222 flows into a barrel conductor 234, through barrel electrical contacts 236A and 236B and to one or more electrical power loads 239. The barrel conductor 234 is positioned concentrically along the axial center AB of the barrel 209 (i.e., the longitudinal axis of the 209) and is a tubular conductor made of aluminum or other metal with a desired electrical conductivity and a desired mechanical strength. The barrel conductor 234 includes an outer surface 238 and an inner surface 240. At least a portion of the outer surface 238 abuts a barrel inner surface 242. At least a portion of the inner surface 240 abuts an outer surface 244 of the cylinder conductor 222. The barrel electrical contacts 236A and 236B are mechanically and electrically connected to the cylinder conductor 222 at electrical contact points 246A and 246B, respectively. Along with providing an electrical pathway from the electrical contacts 236A and 236B to the electrical power loads 239, the electrical contact points 246A and 246B also affix the barrel conductor 234 to a barrel endcap 248.

The arm 210 is a substantially cylindrical body having an outer diameter D1 that is smaller than inner diameter D2 of the barrel conductor 234, allowing the arm 210 to slidable engage into the barrel 209. By "sliding," it is meant that arm 210 may move longitudinally along the AB axis within the barrel 209 as arm 210 is moved axially with respect to the conductor rod 206, from left to right towards B of the AB axis in FIG. 2 for extension and from right to left towards A of the AB axis in FIG. 2 for extension. The result of the sliding is the increase or decrease in the overall length of the conductor rod 206 via arm 210.

As the arm 210 moves longitudinally along the AB axis within the barrel 209, electrical connectivity between the power source 226 and the electrical power loads 239 is maintaining through a liquid junction 250. The liquid junction 250 includes a conductive liquid, located at conduction location 252. The conductive liquid located at conduction location 252 provides for the conduction of electrical power and is a metallic alloy that is liquid at a certain temperature, such as room temperature. An example of a metallic alloys is GALINSTAN. GALINSTAN is brand name of a eutectic alloy composed of gallium, indium, and tin which melts at −19 C (−2 F) and is thus liquid at room temperature. It should be noted, however, that other metal alloys with properties similar to GALINSTAN, such as gallium alloys, gallium-indium alloy, gallium-indium-tin alloy, gallium-indium-tin-zinc alloy, bismuth alloy, lead-bismuth alloy, bismuth-indium-tin alloy, bismuth-indium-tin-zinc alloy, and the like, may be used and are considered to be within the scope of the presently disclosed subject matter.

In some examples, however, eutectic alloys such as GALINSTAN used as the conductive liquid located at conduction location 252 can corrode and essentially destroy the crystalline matrix of metals exposed to the conductive liquid located at conduction location 252. For example, GALINSTAN can react with aluminum to form an aluminum GALINSTAN amalgam that not only structurally destroys the aluminum, but in some instances depending if water or water vapor is present, can release hydrogen gas. To protect various components of the conductor rod 206 from the chemical and physical effects of the conductive liquid located at conduction location 252, the conductive liquid is contained within liquid space 254. The liquid space 254 is a space defined by an interior surface 256 of the cylinder conductor 222 and an outer surface 258 of the barrel conductor 234. The liquid space 254 is surrounded by a corrosion resistant barrier, described in more detail in FIG. 3.

Figure 3:
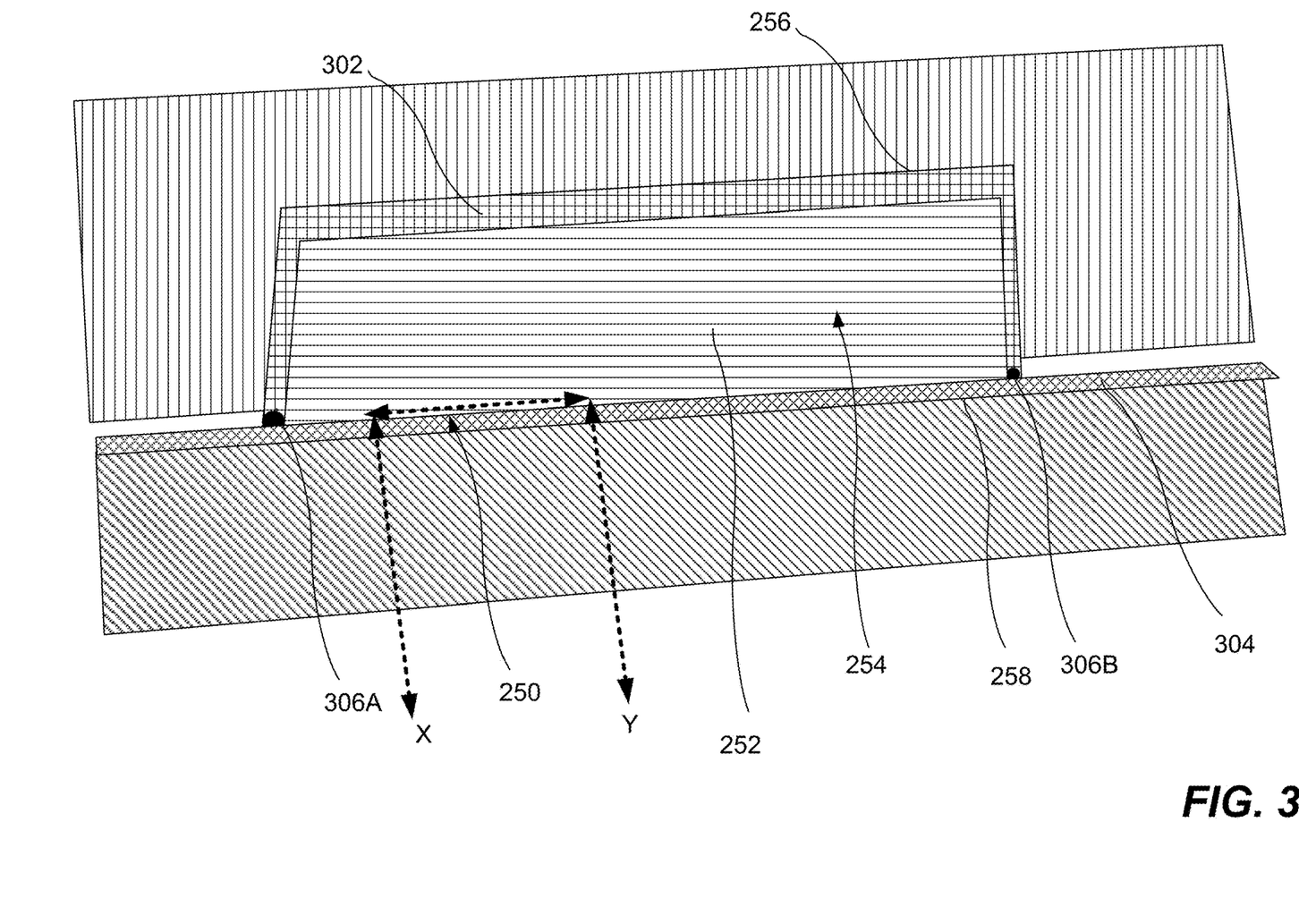
FIG. 3 illustrates a liquid space using corrosion resistant barriers to contain a conductive liquid, in accordance with various examples of the presently disclosed subject matter.

FIG. 3 illustrates the liquid space 254 using corrosion resistant barriers to contain the conductive liquid located at conduction location 252, in accordance with various examples of the presently disclosed subject matter. Illustrated in FIG. 3 are the liquid space 254. The liquid space 254 is the space defined by the interior surface 256 of the cylinder conductor 222 and an outer surface 258 of the barrel conductor 234. To reduce the probability of corrosion occurring due to the contact of the conductive liquid located at conduction location 252 with the interior surface 256 of the cylinder conductor 222 or the outer surface 258 of the barrel conductor 234, corrosion barrier 302 and 304 are provided. The corrosion barrier 304 is a layer of conductive, chemically inert material deposited on the interior surface 256 of the cylinder conductor 222 within the liquid space 254. The corrosion barrier 302 also is a conductive, chemically inert material deposited on the outer surface 258 of the barrel conductor 234. In the examples described herein, the corrosion barrier 302 and the corrosion barrier 304 are each a layer of material deposited using a high velocity air fuel (HVAF) process. It should be noted that other deposition processes may be used and are considered to be within the scope of the presently disclosed subject matter, including, but not limited to, High-Velocity Oxygen-Fuel (HVOF), a plasma-arc spray, or a twin-wire arc spray. The High Velocity Oxygen Fuel (HVOF) process is when fuel and oxygen are fed into a combustion chamber and ignited and combusted continuously. The fuels can be gases (hydrogen, methane, propane, propylene, acetylene, natural gas, etc.) or liquids (kerosene, Ethanol, and the like). Plasma-arc spraying is a process whereby a stream of high temperature plasma and a powder coating are carried via an electric arc to a surface for deposition. Twin-wire arc spraying is a process that uses an electric arc between two consumable electrodes of the surfacing materials as the heat source. A compressed gas atomizes and propels the molten material to the surface for deposition.

As used herein, "high velocity" generally means a deposition process in which material is deposited using propellants that accelerate the deposited materials at spray rates of around 800 m/s to 1400 m/s, though velocities slightly higher and lower than that range can be used and are considered to be within the presently disclosed subject matter. As used herein, an HVAF process is a thermal spray process for deposition of coatings for protection of parts, vessels and structures against abrasion, erosion, and corrosion. The HVAF process runs on a fuel gas such as Propane, Propylene, or Natural gas (supplied from cylinders or gas line at 140 psi), and compressed air (supplied by a 400 CFM air compressor at 125 psi). Added to the HVAF stream is a mixture of a nickel chromium alloy, e.g., Ni-20Cr. In some examples, aluminum oxide ($Al_2O_3$) particles are added to the nickel chromium alloy (shown by way of sample in FIG. 4), though other suitable materials and combinations may also be used. Sealing rings 306A and 306B seal the conductive liquid located at conduction location 252 within the liquid space 254. The sealing rings 306A and 306B can be various materials, such a rubber, silicone, carbon, and the like, that act as a fluid barrier to prevent leakage of the conductive liquid located at conduction location 252 from the liquid space 254.

As the cylinder conductor 222 extends and retracts along the length of the barrel conductor 234, electrical conductivity between the cylinder conductor 222 and the barrel conductor 234 is maintained through the conductive liquid located at conduction location 252. The physical and material construction of the corrosion barrier 302 and the corrosion barrier 304 are designed to provide a conductive path while also protecting their respective surfaces to which the corrosion barrier 302 and the corrosion barrier 304 are deposited. An example of the physical and chemical composition of the corrosion barrier 304 is illustrated in FIG. 4.

Figure 4:
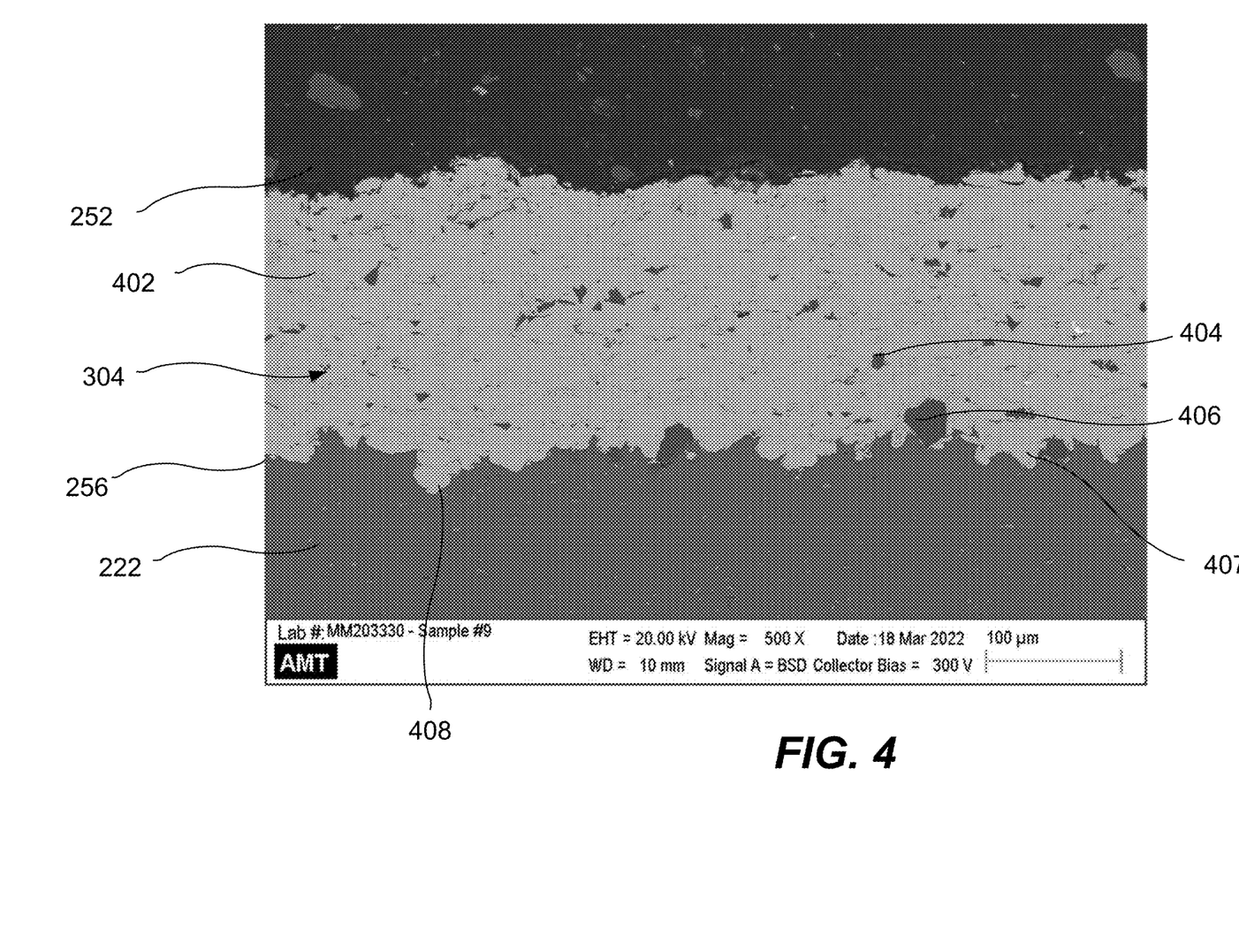
FIG. 4 is a cross-sectional illustration showing a corrosion barrier, in accordance with various examples of the presently disclosed subject matter.

FIG. 4 is a cross-sectional illustration showing the corrosion barrier 304 taken along cut lines XY of FIG. 3, in accordance with various examples of the presently disclosed subject matter. Illustrated is the interior surface 256 of the cylinder conductor 222, the corrosion barrier 304, and the conductive liquid located at conduction location 252. The corrosion barrier 304 is made from a Ni-20Cr matrix 402 having dispersed therein $Al_2O_3$ particles 404 and 406 (by way of example). Although various thicknesses may be used, in some examples, the Ni-20Cr matrix 402 has a thickness of approximately 50 μm to 600 μm. The cylinder conductor 222 can be constructed of various metals, including, but no by way of limitation, 6061 aluminum. In order to provide for a physical (and thus chemical) barrier between the conductive liquid located at conduction location 252 and the cylinder conductor 222, the corrosion barrier 304 has a low porosity, or a low fraction of the volume of voids over the total volume of the Ni-20Cr matrix 402.

The HVAF provides for the low porosity due to the high heat and velocity experienced by the Ni-20Cr and $Al_2O_3$ particles 404 during deposition. Not only does the high velocity and heat essentially compact the Ni-20Cr and $Al_2O_3$ particles 404 in the Ni-20Cr matrix 402, the high velocity of the Ni-20Cr and $Al_2O_3$ particles 404 impinge upon the interior surface 256 of the cylinder conductor 222, filling a large portion of the surface deformations of the interior surface 256. The surface deformations, such as surface deformations 407 and 408, caused by the kinetic energy of the Ni-20Cr and/or $Al_2O_3$ particles 404 impinging upon the interior surface 256. The velocity of the Ni-20Cr and $Al_2O_3$ particles 404 cause the Ni-20Cr and $Al_2O_3$ particles 404 to form and fill the surface deformations 407 and 408. Thus, the HVAF process using the Ni-20Cr and $Al_2O_3$ particles 404 to create the Ni-20Cr matrix 402 for the corrosion barrier 304 has a relatively low porosity, decreasing the probability that the conductive liquid located at conduction location 252 comes in contact with the interior surface 256. Further, the Ni-20Cr and $Al_2O_3$ particles 404 provide for a degree of conductivity, thus allowing electrical power to move between the cylinder conductor 222 and the barrel conductor 234. In some examples, with the Ni-20Cr matrix 402 having a thickness of around 50 μm to 600 μm, the resistivity of the Ni-20Cr matrix 402 can range from 0.0004 ohms to 0.0013 ohms. As mentioned above, in order to achieve the low porosity and relatively low resistivity of the Ni-20Cr matrix 402, a high velocity process is used to form the Ni-20Cr matrix 402, illustrated by way of example in FIG. 5.

Figure 5:
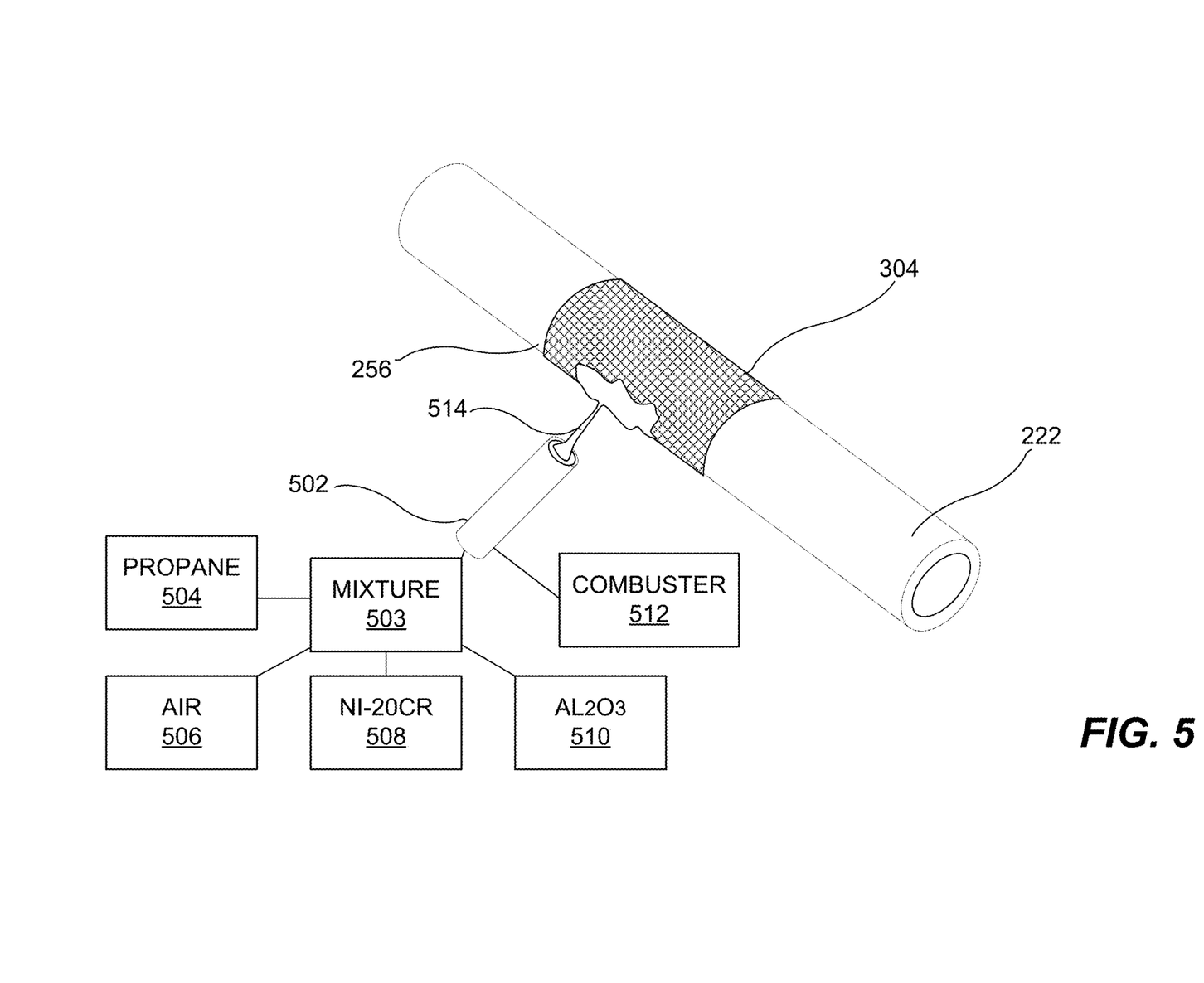
FIG. 5 is an example HVAF system for depositing a corrosion barrier on an interior surface of a cylinder conductor, in accordance with various examples of the presently disclosed subject matter.

FIG. 5 is an example HVAF system 500 for depositing the corrosion barrier 304 on the interior surface 256 of the cylinder conductor 222, in accordance with various examples of the presently disclosed subject matter. The HAVF system 500 includes a nozzle 502 that receives a mixture 503 of propane 504, air 506, Ni-20Cr 508, and $Al_2O_3$ 510. The mixture 503 enters the nozzle 502. A combustor 512, such as a spark plug or other ignition system, ignites the propane 504, creating high pressure within the nozzle 502. The combustion temperature ranges from 1200-1800 C depending on fuel gas and torch design. Combustion temperatures within this range can provide for the gradual heating of the Ni-20Cr 508 and $Al_2O_3$ 510 to or slightly above the metal's melting temperature. The high pressure accelerates the mixture 503 at velocities from approximately 800 m/s to over 1400 m/s thru the nozzle 502 to generate a flame 514. The Ni-20Cr 508 and $Al_2O_3$ 510 within the flame 514 are deposited onto the interior surface 256 of the cylinder conductor 222.

Figure 6:
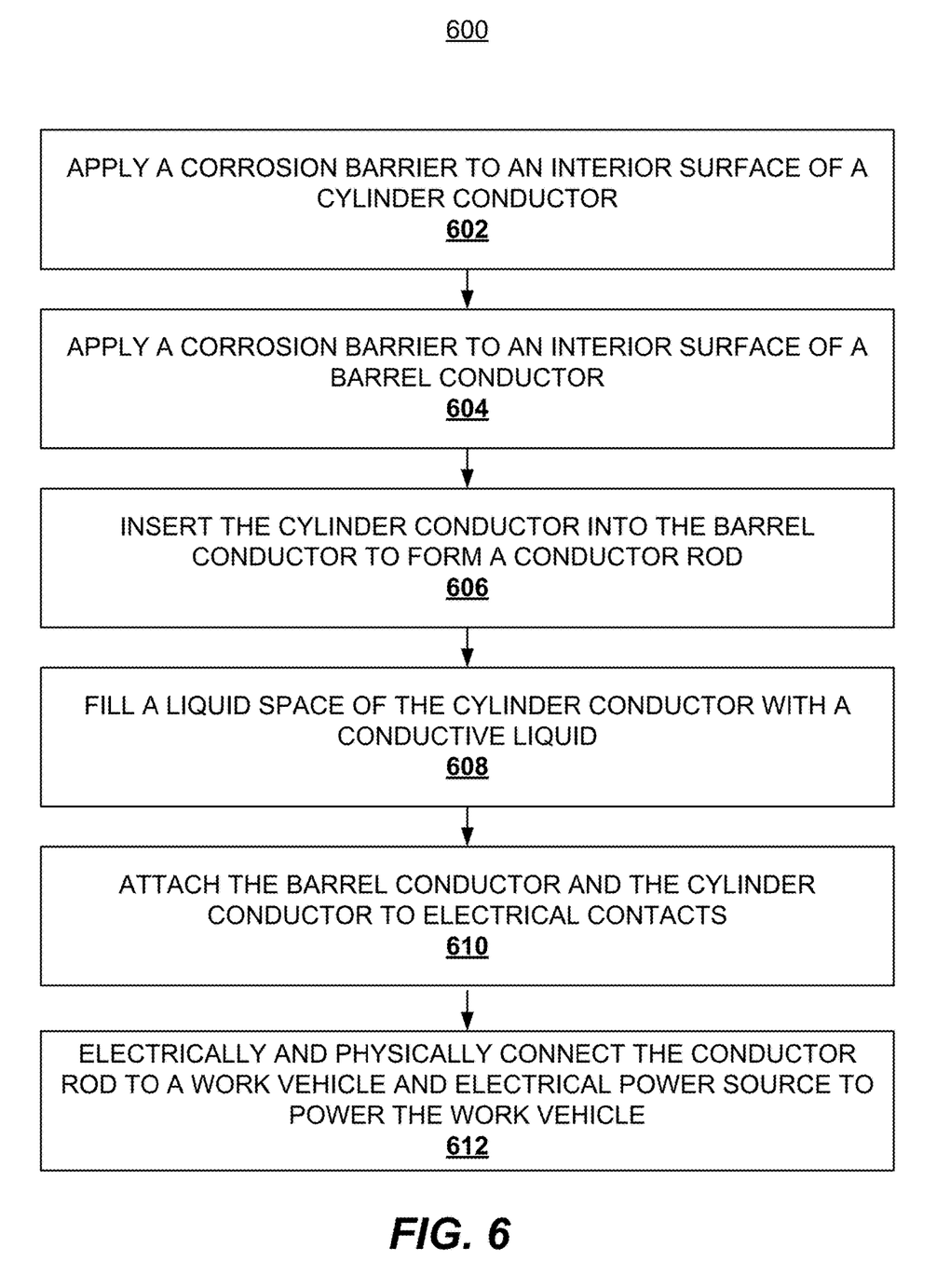
FIG. 6 is a flowchart depicting a method of constructing a conductor rod that may be used for a work machine using a liquid conductor corrosion barrier, in accordance with various examples described herein.

FIG. 6 illustrates a method 600 of constructing the conductor rod 206 that may be used for the work machine 100 using a liquid conductor corrosion barrier, in accordance with various examples described herein. As shown in FIG. 6, at step 602, the corrosion barrier 304 is applied to the interior surface 256 of the cylinder conductor 222 using an HVAF process, such as the HVAF system 500 of FIG. 5. The corrosion barrier 304 is constructed from a Ni-20Cr matrix 402 consisting of Ni-20Cr and $Al_2O_3$.

In step 604, the corrosion barrier 302 is applied to the outer surface 258 of the barrel conductor 234 using an HVAF process, such as the HVAF system 500 of FIG. 5. The corrosion barrier 304 is constructed from a Ni-20Cr matrix 402 consisting of Ni-20Cr and $Al_2O_3$.

In step 606, the cylinder conductor 222 is inserted into the barrel conductor 234, as illustrated in FIG. 2. From an axial center AB extending along the center of the cylinder conductor 222 towards a barrel outer surface 224, the cylinder conductor 222 is positioned concentrically along the axial center AB of the barrel 209.

In step 608, the liquid space 254 is filled at least partially with the conductive liquid located at conduction location 252. The liquid space 254 is the space defined by the interior surface 256 of the cylinder conductor 222 and an outer surface 258 of the barrel conductor 234. The liquid space 254 may be filled with the conductive liquid located at conduction location 252 using various technologies, which are considered to be within the scope of the presently disclosed subject matter.

In step 610, the barrel conductor 234 and the cylinder conductor 222 are attached to electrical contacts. The arm electrical contacts 228A and 228B are mechanically connected to the cylinder conductor 222 at electrical contact points 230A and 230B, respectively. Along with providing an electrical pathway from the electrical contacts 228A and 228B to the cylinder conductor 222, the electrical contact points 230A and 230B also affix the cylinder conductor 222 to an arm endcap 232. The barrel electrical contacts 236A and 236B are mechanically and electrically connected to the cylinder conductor 222 at electrical contact points 246A and 246B, respectively. Along with providing an electrical pathway from the electrical contacts 236A and 236B to the electrical power loads 239, the electrical contact points 246A and 246B also affix the barrel conductor 234 to a barrel endcap 248.

At step 612, the conductor rod 206 is electrically and physically connected to the work machine 100 and to the power rail 108 via trailing arms 116 and contactor 118 to provide electrical power to the work machine 100.

Those of ordinary skill in the field will also appreciate that the principles of this disclosure are not limited to the specific examples discussed or illustrated in the figures. For example, while conductor rod 106 and 206 are illustrated with two conductors, three or more conductors may be employed following the principles explained in the present disclosure. In addition, the principles disclosed are not limited to implementation on a work machine. Any moving vehicle deriving electrical power from a ground-based conductor rail could benefit from the examples and techniques disclosed and claimed.

INDUSTRIAL APPLICABILITY

The present disclosure provides a corrosion barrier for the use a conductive liquid in a system for a moving machine having a conductor rod configured to receive electrical energy from an energized rail to the moving machine, where the conductor rod extends and retracts. As noted above, the conductive liquid, comprising gallium alloys, gallium-indium alloy, gallium-indium-tin alloy, gallium-indium-tin-zinc alloy, bismuth alloy, lead-bismuth alloy, bismuth-indium-tin alloy, bismuth-indium-tin-zinc alloy, and the like, is used to maintain the electrical connection between a power supply and the work machine. To protect the conductors within the conductor rod from the corrosive effects of the conductive liquid, a non-porous, electrically conductive corrosion barrier is deposited onto surfaces that may come in contact with the conductive liquid. Using a high velocity process such as HVAF, Ni-20Cr with $Al_2O_3$ particles are deposited onto the surfaces. The use of the corrosion barrier allows for the use of the conductive liquid, while reducing the probability that the conductive liquid comes in contact with the surface of the conductors.

Unless explicitly excluded, the use of the singular to describe a component, structure, or operation does not exclude the use of plural such components, structures, or operations or their equivalents. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been particularly shown and described with reference to the embodiments above, it will be understood by those skilled in the art that various additional embodiments may be contemplated by the modification of the disclosed machines, systems, and methods without departing from the spirit and scope of what is disclosed. Such embodiments should be understood to fall within the scope of the present disclosure as determined based upon the claims and any equivalents thereof.

What is claimed is:

1. A work machine, comprising:
   an electric engine;
   traction devices configured to cause movement of the work machine when powered by the electric engine;
   a conductor rod configured to convey electrical energy to the work machine during a movement of the work machine, the conductor rod having a first end and a second end, the conductor rod comprising:
   a barrel comprising a barrel conductor having an inner diameter and a longitudinal center defining an axis between the first end and the second end; and
   an arm comprising a cylinder conductor arranged concentrically and slidable engaged into the barrel conductor around the axis;
   a liquid space configured to contain a conductive liquid, the liquid space defined by an interior surface of the cylinder conductor and an outer surface of the barrel conductor;
   a first corrosion barrier along the interior surface of the cylinder conductor and a second corrosion barrier along the outer surface of the barrel conductor, the first corrosion barrier and the second corrosion barrier comprising a metal alloy having a chemical resistance and a low permeability to the conductive liquid contained within the liquid space; and
   a liquid junction formed from the liquid space, the first corrosion barrier, the second corrosion barrier, and the conductive liquid, the liquid junction configured to electrically connect the barrel conductor to the cylinder conductor.

2. The work machine of claim 1, wherein the first corrosion barrier and the second corrosion barrier comprise a matrix of nickel chromium alloy (Ni-20Cr).

3. The work machine of claim 2, wherein the first corrosion barrier and the second corrosion barrier further comprise aluminum oxide ($Al_2O_3$) particles.

4. The work machine of claim 2, wherein the first corrosion barrier and the second corrosion barrier are deposited using a high velocity air fuel process.

5. The work machine of claim 2, wherein the first corrosion barrier or the second corrosion barrier are deposited using a High-Velocity Oxygen-Fuel (HVOF), a plasma-arc spray, or a twin-wire arc spray.

6. The work machine of claim 1, wherein the conductive liquid comprises gallium alloys, gallium-indium alloys, gallium-indium-tin alloys, gallium-indium-tin-zinc alloys, bismuth alloys, lead-bismuth alloys, bismuth-indium-tin alloys, bismuth-indium-tin-zinc alloys, or GALINSTAN.

7. The work machine of claim 1, wherein the barrel conductor is electrically connected to an electrical load through a barrel electrical contact and the cylinder conductor is electrically connected to a power source through an arm electrical contact.

8. A conductor rod, comprising:
   a barrel comprising a barrel conductor having an inner diameter and a longitudinal center defining an axis between a first end and a second end; and
   an arm comprising a cylinder conductor arranged concentrically and slidable engaged into the barrel conductor around the axis;
   a liquid space configured to contain a conductive liquid, the liquid space defined by an interior surface of the cylinder conductor and an outer surface of the barrel conductor;
   a first corrosion barrier along the interior surface of the cylinder conductor and a second corrosion barrier along the outer surface of the barrel conductor, the first corrosion barrier and the second corrosion barrier comprising a metal alloy having a chemical resistance and a low permeability to the conductive liquid contained within the liquid space; and
   a liquid junction formed from the liquid space, the first corrosion barrier, the second corrosion barrier, and the conductive liquid, the liquid junction configured to electrically connect the barrel conductor to the cylinder conductor.

9. The conductor rod of claim 8, wherein the first corrosion barrier and the second corrosion barrier comprise a matrix of nickel chromium alloy (Ni-20Cr) and aluminum oxide (Al$_2$O$_3$) particles.

10. The conductor rod of claim 9, wherein the matrix has a thickness of approximately 50 µm to 600 µm.

11. The conductor rod of claim 9, wherein the first corrosion barrier and the second corrosion barrier are deposited using a high velocity air fuel process.

12. The conductor rod of claim 11, wherein the high velocity air fuel process deposits the nickel chromium alloy (Ni-20Cr) and aluminum oxide (Al$_2$O$_3$) particles at a velocity of 800 m/s to approximately 1400 m/s.

13. The conductor rod of claim 8, wherein the conductive liquid comprises gallium alloys, gallium-indium alloys, gallium-indium-tin alloys, gallium-indium-tin-zinc alloys, bismuth alloys, lead-bismuth alloys, bismuth-indium-tin alloys, bismuth-indium-tin-zinc alloys, or GALINSTAN.

14. The conductor rod of claim 8, wherein the barrel conductor is electrically connected to an electrical load through a barrel electrical contact and the cylinder conductor is electrically connected to a power source through an arm electrical contact.

15. A method of manufacturing a conductor rod, the method comprising:
applying a first corrosion barrier to at least a portion of an interior surface of a cylinder conductor using a using a high velocity air fuel process, the first corrosion barrier comprising a first matrix of a nickel chromium alloy (Ni-20Cr) and aluminum oxide (Al$_2$O$_3$) particles;
applying a second corrosion barrier to at least a portion of an exterior surface of a barrel conductor using the high velocity air fuel process, the first corrosion barrier comprising a second matrix of a nickel chromium alloy (Ni-20Cr) and aluminum oxide (Al$_2$O$_3$) particles, and wherein the interior surface of the cylinder conductor and the exterior surface of the barrel conductor define a liquid space for containing a conductive liquid;
inserting the cylinder conductor into the barrel conductor to form a conductor rod; and
filling at least a portion of the liquid space with the conductive liquid.

16. The method of claim 15, wherein the first corrosion barrier and the second corrosion barrier have a thickness of approximately 50 µm to 600 µm.

17. The method of claim 15, wherein the high velocity air fuel process deposits the nickel chromium alloy (Ni-20Cr) and aluminum oxide (Al$_2$O$_3$) particles at a velocity of 800 m/s to approximately 1400 m/s.

18. The method of claim 15, wherein the conductive liquid comprises gallium alloys, gallium-indium alloys, gallium-indium-tin alloys, gallium-indium-tin-zinc alloys, bismuth alloys, lead-bismuth alloys, bismuth-indium-tin alloys, bismuth-indium-tin-zinc alloys, or GALINSTAN.

19. The method of claim 15, further comprising:
electrically attaching the barrel conductor to an electrical load through a barrel electrical contact; and
electrically attaching the cylinder conductor to a power source through an arm electrical contact.

20. The method of claim 15, wherein the cylinder conductor and the barrel conductor constructed from 1061 aluminum.

* * * * *